A. A. SODERBERG.
GUIDE MAP.
APPLICATION FILED MAY 3, 1918.
1,408,417.
Patented Feb. 28, 1922.
2 SHEETS—SHEET 1.
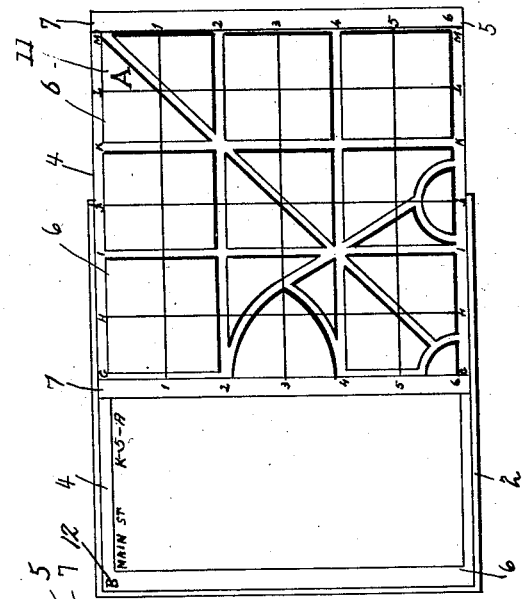
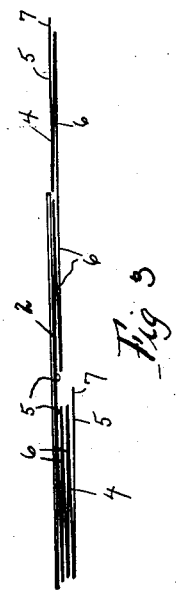
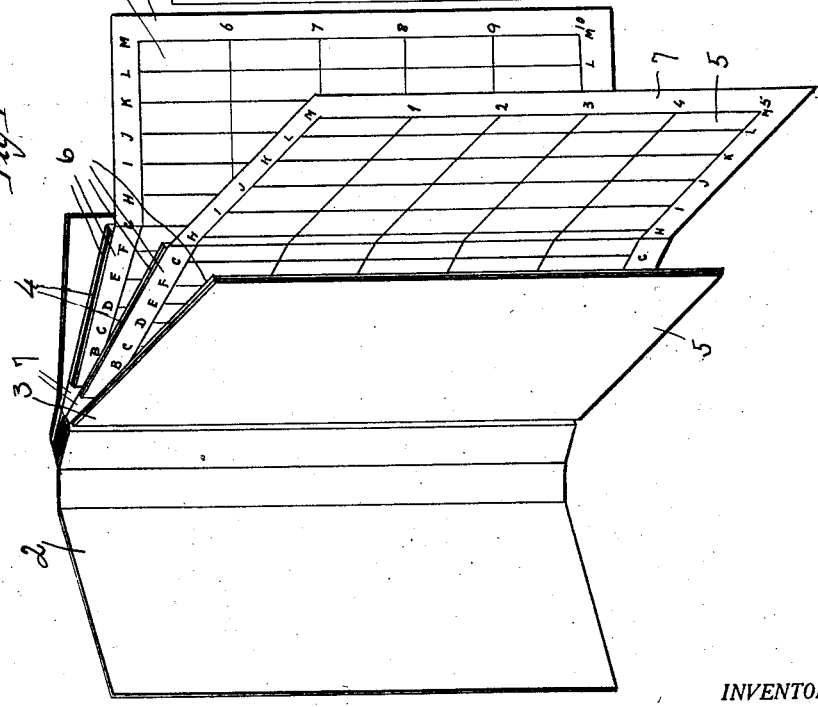
INVENTOR.
Alfred A. Soderberg
BY
W. W. Williamson
ATTORNEY.

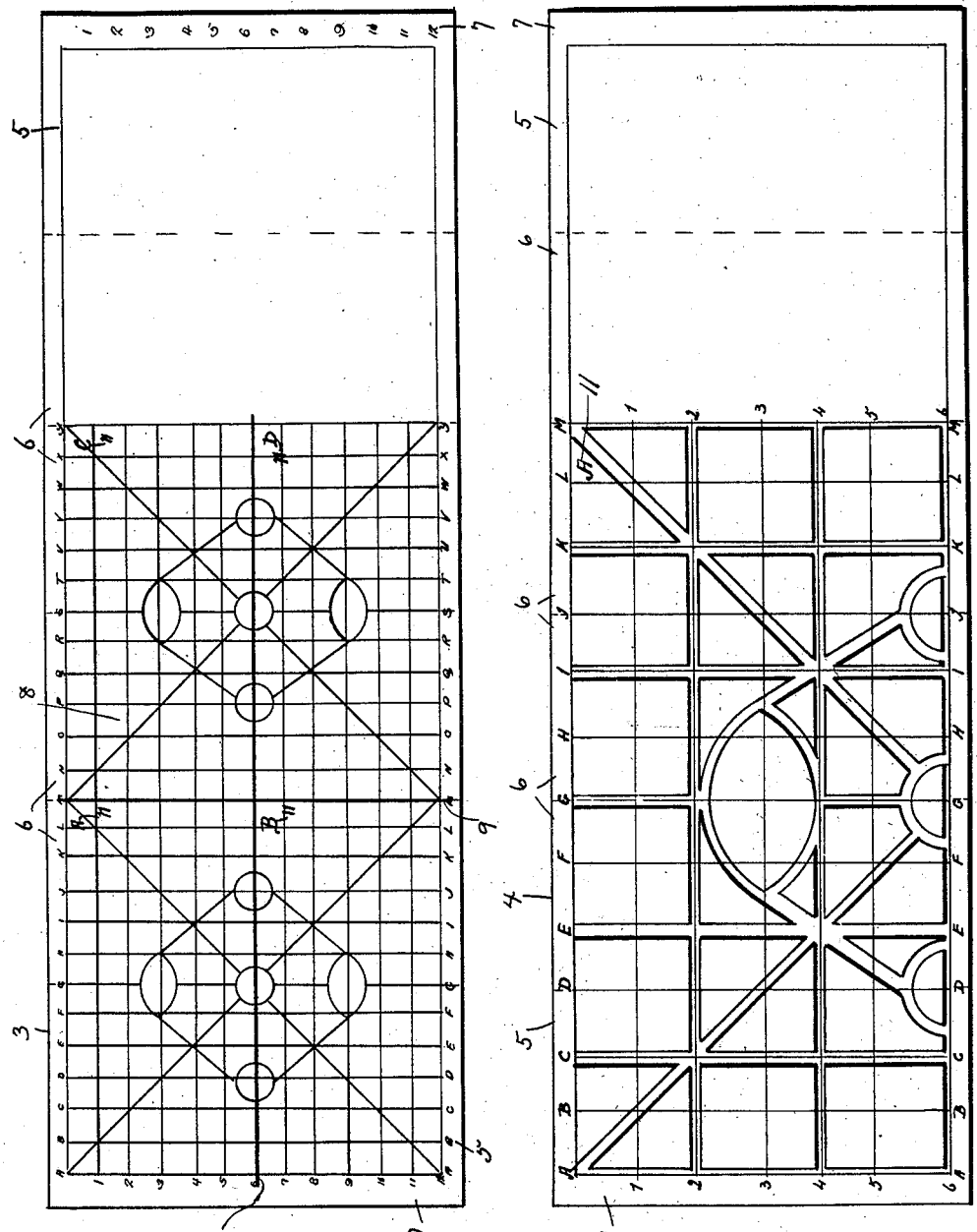

UNITED STATES PATENT OFFICE.

ALFRED A. SODERBERG, OF PHILADELPHIA, PENNSYLVANIA.

GUIDE MAP.

1,408,417.   Specification of Letters Patent.   Patented Feb. 28, 1922.

Application filed May 3, 1918. Serial No. 232,254.

*To all whom it may concern:*

Be it known that I, ALFRED A. SODERBERG, a citizen of the United States, residing at Philadelphia, in the county of Philadelphia and State of Pennsylvania, have invented new and useful Improvements in Guide Maps, of which the following is a specification.

My invention relates to new and useful improvements in guide maps such as those used in locating places in countries, States, cities or towns, and has for its object to construct such a device from a plurality of folders enclosed within a suitable cover, each of the sheets forming the different folders being folded in zigzag fashion in one direction only, preferably vertically, whereby each of said folders forms a number of leaves so that they may be opened from either of their two edges in a manner somewhat similar to the leaves of a book. One face of each of these folders has depicted thereon certain maps, sections of maps or diagrams of countries, States, cities or towns, so that any section of said maps or diagrams may be readily referred to by opening a certain part of any one of the folder sheets while on the other face of each folder sheet is printed any desired information such as the names of localities, the cities or rivers, etc., in a country or State, or the streets, parks, etc., in a city or town and this reference matter is printed in columns within the folds of the sheets after the manner of printed matter on the pages of a book.

The invention is further designed to facilitate and make more convenient the use of a pocket map by enabling the user to instantly open and spread it before him and locate the object or place wanted at a glance and it is also designed to furnish in book form a street directory or other useful information having reference to the map or design in question by using the reverse side of the map which by the arrangement of the folds of the sheets can be used and turned in the same manner as the leaves of a book, while the map can also be used in the same manner.

Another object of the invention is to make possible and practicable the production and use of pocket maps on a much larger scale than is generally the practice at the present time, as the sheets or folders may be upward of three feet long and as many of these folder sheets as desirable may be provided in the one guide book without interfering with the convenience of its use.

A still further object of the invention is to provide in a device of the character stated, a guide, key or main map upon a single sheet folded to produce a plurality of collapsible leaves to provide additional maps on a larger scale of different sections of the main or key map and corresponding to a key letter or numeral on said main map which are designated on said key or main map by means of straight lines drawn across the same either perpendicular or horizontal, the sections of the map thus produced being lettered or numbered to correspond with the enlarged sectional maps.

With these ends in view, this invention consists in the details of construction and combination of elements hereinafter set forth and then specifically designated by the claims.

In order that those skilled in the art to which this invention appertains may understand how to make and use the same, I will describe its construction in detail referring by numerals to the accompanying drawings forming a part of this application, in which:—

Fig. 1, is a perspective view of a guide map embodying my invention showing it partially open with some of the leaves of some of the folders opened or unfolded.

Fig. 2, is a face view thereof on a reduced scale and in an open flat position.

Fig. 3, is an edge view thereof.

Fig. 4, is an enlarged face view of one of the folders or sheets with a map of a locality thereon, and Fig. 5, is a similar view of one of the folder sheets showing one of the sections of the map illustrated in Fig. 4 on an enlarged scale.

In carrying out my invention as here embodied, 2 represents a cover, binder or holder of any desired or approved construction in which are bound a plurality of folders or folder sheets, one of said folder sheets being represented by the numeral 3 and the others by the numeral 4.

These folders or folder sheets are secured in the cover or binder at one end only and are then folded along perpendicular or vertical lines in zigzag fashion to form leaves or pages, the endmost pages being designated by the numeral 5 while the inner or central pages are designated by the numeral 6. By forming the leaves or pages in this manner, it is possible to open the leaves from either of the two edges of the folders when they are in their collapsed or unexpanded positions and in order to gain access to the different leaves, that is to say, that by opening the different leaves from one edge, the different sections of the obverse face of the folder sheet will be exposed, while opening the leaves from the other edge the different sections of the reverse face of the folder sheets will be exposed.

In practice it is preferred that the two end leaves of some or all of the folder sheets be of greater width than the inner or central leaves, so as to leave an overhanging edge or extension 7 for a purpose to be hereinafter described.

On the obverse side of the folder sheet 3 is a main or key map or diagram 8 of a locality, country, city, town or physical characteristic of the foregoing and said map or diagram is intersected by either perpendicular lines 9 or horizontal lines 10 or both, as here shown, to divide the key map into a number of sections and each of these sections is provided with a suitable indication mark or key letter or numeral printed directly upon each of these sections, said indication marks being here shown as the letters A, B, C, D and denoted by the reference numeral 11. If the map or diagram printed on this sheet does not occupy the entire obverse face thereof, the remainder may be utilized for desirable information, advertising matter or for directions as how to use the guide.

On the reverse side of said sheet may be printed desirable information or reference matter concerning the maps or diagrams or may be used as a street index where the maps are of a city or town and this information is printed in columns so as to occupy the leaves or pages formed from the reverse side of the sheet when folded and these leaves or pages may be numbered in the same manner as the leaves of a book.

On the obverse face of the other sheets 4 are printed or otherwise impressed, the different sections A, B, C, or D of the key map on an enlarged scale as plainly shown in Fig. 5 which represents section A of the key map shown in Fig. 4, and the size of these sectional maps may be sufficiently large to plainly bring out or emphasize the prominent features such as streets of a city and these sectional maps or diagrams are intersected with guide lines which are numbered and lettered, said numbers and letters being in alinement with the different guide lines and located in the margin around the sectional maps, it being understood that said sectional maps are slightly smaller than the dimensions of the sheet so as to leave a margin entirely around the same, as plainly shown in Fig. 5.

On the pages of the reverse faces produced by the folds is printed the information matter preferably in index form as shown in Fig. 2 with the name of the locality or street followed by the letter and number referring to the guide lines and also the indication letter or numeral referring to the enlarged sectional maps in which the locality or street referred to will be found, for instance the street indicated by the key letter and numeral K—5—A on the index portion of the guide map shown in Fig. 2 will be found on map A, Fig. 5 adjacent the junction of the line K with line 5. Each of the sheets on which the sectional maps are impressed has a key letter 12 printed thereon as E' shown in Fig. 2.

In practice, any one of the maps may be entirely unfolded so that the same may be referred to as a whole or any part of any of the maps either the key or enlarged sectional maps may be referred to by opening the desired pages or leaves after the manner of a book, but beginning at the inner end of the folder or sheet to which reference is made, and when so opened, the two end leaves 5 of each sheet being of greater width than the central or inner leaves, the guide members will be visible beyond the folded or creased edges of said inner leaves, as plainly shown in Fig. 2. For instance if the obverse side of the folder is desired to be seen the index thereof will be found on the extension 7 of the outer end leaf while the index for the reverse side will be found on the first end leaf.

If the device is made up in the form of a city street guide and it is desired to locate a particular street, said street is first found in the street index or information part of the device which then gives the number or letter of the enlarged sectional map which as will be obvious is also the indication mark of a certain section on the key map. By turning to the sectional map indicated and following the numbered and lettered guide lines which are also given in the index, the street may be readily located and knowing its position relative to the sectional map, its approximate position may be readily noted on the main or key map which will give its position or location relative to the entire location or city covered by the guide.

Of course I do not wish to be limited to the exact details of construction as herein shown as these may be limited within the limits of the appended claims without departing from the spirit of my invention.

Having thus fully described my invention what I claim as new and patentable is:—

1. A guide map holder comprising a cover folded in the middle, a plurality of folder sheets having their inner ends connected with the cover at the folds, said folder sheets being folded in zig-zag fashion to produce leaves or pages, the end pages or leaves being wider than the middle pages or leaves.

2. In a device of the character stated, a plurality of folder sheets folded in zig-zag form to produce leaves or pages some of which are accessible from one edge of the folders while others are accessible from the other edge of said folders and a folder cover secured to one end of the folder sheets and of a size to embrace said sheets when the latter are closed, the endmost leaves or pages formed by folding certain of the folder sheets, being of greater width than the intermediate leaves or pages so as to form extending edges containing guide numerals, a key map on the obverse face of one of the folder sheets having lines across the same, other maps representing the different divisions of the key map on an enlarged scale on the obverse faces of the other folder sheets and suitable information in columns form on the reverse side of said folder sheets.

3. A guide of the character described comprising a cover or binder, a plurality of folder sheets attached to said cover at one end and folded in zig-zag form to produce leaves or pages, the endmost pages of certain of said folder sheets being of greater width than the intermediate leaves or pages to provide overhanging extensions, the foremost folder sheet having a main or key map on its obverse face intersected by lines for subdividing said key map into a number of divisions, each division being designated by a suitable indication mark, the other folder sheets having maps on their obverse faces, each map representing one of the divisions of the key map on an enlarged scale and intersected by guide lines designated by suitable guide numerals and letters arranged in the margins at the top and bottom of said maps and along the overhanging extensions, said sectional maps being arranged in consecutive order and provided with indication marks corresponding to the indication marks on the respective subdivisions of the key map, the reverse faces of the folder sheets containing suitable information in column form and arranged with relation to the pages formed by the folds of the folder sheets.

4. In a device of the character stated, the combination with a folder sheet containing a key map, of a plurality of other folder sheets containing a series of maps, the series of maps being sub-divisions of the key map, the reverse faces of said folder sheets containing suitable information, all of said folder sheets being secured together along one end and folded in zig-zag form to permit sections of either face of any one sheet to be examined after the manner of the leaves of a book.

In testimony whereof, I have hereunto affixed my signature:

ALFRED A. SODERBERG.